United States Patent Office 2,955,994
Patented Oct. 11, 1960

2,955,994

RADIOCHEMICAL PREPARATION OF ION-EX-
CHANGE RESINS AND SOIL CONDITIONERS

Donald A. Guthrie, Cranford, and Robert M. Thomas,
Westfield, N.J., assignors to Esso Research and Engineering Company, a corporation of Delaware No Drawing. Filed Dec. 16, 1954, Ser. No. 475,842

6 Claims. (Cl. 204—158)

The present invention relates to improvements in carrying out polymerization reactions. More particularly, the invention is concerned with the initiation, activation or promotion of polymerization reactions by nuclear radiation. In brief compass, the invention pertains to an improved method of carrying out polymerization reactions by exposing the reagents to radiation emitted by radioactive materials, particularly the radioactive fission products obtained as by-products or waste materials in the operation of atomic piles for the production of atomic energy.

More particularly, the invention pertains to the polymerization and copolymerization of unsaturated compounds by exposing mixtures of unsaturated monomers to the radiation emitted by sources of high energy radioactivity. By a proper selection of the starting materials, radiation intensity and radiation time, polymers useful as ion-exchange resins, soil conditioners and the like are obtained.

Polymeric materials have been prepared heretofore by polymerizing mixtures of the monomers involved at elevated temperatures of about 100°–400° F. in the presence of various catalysts, particularly peroxides, such as benzoyl peroxide and others. This method involves a rather complicated process control since, in many cases, relatively high initial temperatures are required to start the reaction while thereafter the temperature must be carefully controlled and sometimes reduced to prevent over-polymerization or gelation. Also, the product must be treated to remove or neutralize the catalyst or its degradation products as well as certain other by-products which usually interfere with the contemplated use of the polymer. Last but not least, it is difficult to operate this process in a continuous fashion because of the required control of a plurality of process variables, such as time, temperature, catalyst concentration, etc. The present invention overcomes these difficulties and affords various additional advantages as will appear from the description hereinafter.

In accordance with the present invention, polymers suitable as ion-exchange resins and soil conditioners are prepared by subjecting mixtures of maleic anhydride with non-conjugated diolefins or with mono-olefins or both to high energy radioactive radiation for a relatively short period of time sufficient to effect the desired degree of polymerization. Types of radiation suitable for the purpose of the invention include high energy electro-magnetic radiation such as gamma rays and X-rays; and high velocity electrons such as beta rays; as well as alpha particles.

These types of radiation may be supplied by naturally occurring radioactive materials, such as radium and its compounds, which emit alpha, beta and gamma rays. Fission by-products of processes generating atomic power and/or fissionable materials, which emit high energy gamma rays, afford a highly desirable and most abundant source of radioactivity suitable for the purposes of the invention. These by-products include elements with atomic numbers ranging from 30 (zinc) to 63 (europium) and their compounds. They are formed in the course of converting uranium, thorium and other fissionable material in an atomic reactor. Radiation from an operating reactor itself can also be used. Only sources of radiation from which a field intensity of at least 10,000 R./hour can be obtained are practical for the purposes of this invention.

Materials made radioactive by exposure to neutron radiation, such as radioactive cobalt ($Co^{60}$), europium 152 or europium 154 which emit gamma rays, may likewise be used. Suitable sources of high velocity electrons are the beams of electron accelerators, such as the Van de Graaf generator or the betatron. In general, however, high intensity gamma radiation and its well known sources, such as nuclear fission by-products, operating nuclear reactors, and materials made radioactive by neutron radiation are preferred for the purposes of the invention mainly because of the relatively high penetrating power of gamma radiation.

The process of the invention has several important advantages. Polymerization by means of radioactive irradiation is no more expensive than polymerization by means of conventional chemical procedures, such as peroxide catalysts. In addition, this process possesses the following advantages:

(1) High temperatures are not required to initiate the polymerization reaction. This means that the polymerization may be carried out at ambient temperature without providing heat for the process. With peroxide initiated polymerization, the reaction mixture must be heated to a temperature range in which the peroxide will decompose. In using benzoyl peroxide, one of the more common methods for initiating commercial polymerization reactions, it is necessary to heat the reactants to the neighborhood of 120°–200° F. for polymerization to occur.

(2) The reaction is easily controlled. With peroxide polymerization catalysts, the rate at which the chain initiators are produced depends not only upon the concentration of the peroxide and the temperature, but also upon little understood secondary chemical changes in the peroxide decomposition products. The rate at which chain initiating gamma rays are produced by the radioactive source is constant for long half-life isotopes. Therefore, at a given temperature the copolymerization will be quite even and not subject to sudden acceleration or deceleration as is the case with peroxide catalysts. Also, with conventional peroxide catalysis it is necessary to heat the reaction mixture to initiate the polymerization process after which rapid cooling may be required so that the polymerization does not run away. Difficult control problems of this type are avoided in accordance with the invention. As a result, the products have a more uniform molecular weight range which will result in quality advantages. Another effect of this regular reaction rate is the production of a clear, water-white product which is superior in appearance to that produced by conventional chemical methods.

(3) There is no catalyst contamination in the products polymerized by gamma irradiation. Since the radioactive material need not come in direct contact with the reactants, and since the gamma rays themselves are merely light, the problem of removing initiating materials from the resulting polymer does not exist. The absence of catalyst contamination in the final product results in greater thermal stability of the polymer. It should be pointed out that gamma ray irradiation does not make a substance radioactive.

(4) Radiation initiation is readily adaptable for continuous polymerization processes. Since the irradiation from isotope sources is given out on a 24-hour per day basis from an irradiation source, and since its emission is regular and is not affected by temperature or other outside phenomena, the catalytic effect is controlled in such radiation initiated polymerizations solely by the time of residence of the reactant within the irradiation zone. For all practical purposes, the initiator is not consumed as is the case with chemical initiators. In addition, a radiation source, such as a gamma source, produces no products which must be removed from the reaction zone. These features permit the design of a plant which can manufacture polymer on a 24-hour per day basis by merely pumping monomers through the radiation given out by a suitable source.

The above-described process is applied, according to the present invention, to the production of copolymers of maleic anhydride with a non-conjugated diolefin or with a non-conjugated diolefin and a mono-olefin. A solvent for the reaction will generally be necessary since maleic anhydride is relatively insoluble in the hydrocarbon olefins. Suitable solvents may be dioxane, ethyl acetate and the like. The temperature of the reaction mixture need not be elevated and may cover the range from 0° to 300° F., preferably 60° to 80° F.

When a non-conjugated diolefin is used alone with maleic anhydride a cross-linked, insoluble resin is usually obtained with a composition of 1 mole of olefin to 2 moles maleic anhydride. The ratio of maleic anhydride to diolefin then will probably range from 1/1 to 5/1 with a ratio of 2/1 preferred. These products will usually be more useful as ion-exchange resins after hydrolysis of the anhydride portions of the molecule due to their insolubility.

In order to obtain a partially soluble, slightly less cross-linked polymer for use as a soil conditioning agent, part or all of the diolefin is replaced with mono-olefin. In this case the ratio of reactants has a much wider range covering maleic anhydride/combined olefin of 1/5 to 5/1 with the ratio of olefins covering the range diolefin/olefin of 95/5 to 5/95 or even 0/100.

Diolefins which may be used include dimethallyl; pentadiene 1,4; or hexadiene 1,4 or 1,5; heptadiene 1,4; heptadiene 1,5; and heptadiene 1,6; and so on. Alkyl or aryl substituted diolefins related to the above examples may also be used.

Olefins which may be used include any paraffinic, naphthenic, or aromatic mono-olefin such as butene-2, isobutylene, cyclohexene, vinyl cyclohexane, styrene or the like.

Conventional means of irradiating materials with ionizing radiation may be employed to carry out the process of the invention. For example, batches of the reaction mixtures may be inserted in, or reactant streams passed through, pipes made of or containing the radioactive material and shielded from the outside to protect the operator. Another suitable arrangement is described in British Patent 708,901, published May 12, 1954. In accordance with this procedure, liquefiable organic substances such as petroleum fractions are fed to a pile containing fissionable material where they are held for a sufficient time to effect the desired radiation. The irradiated material is passed to shielded storage tanks where the product is allowed to gradually lose its activity. It is then fractionated and otherwise treated. Other suitable means for carrying out the process of the invention may appear to those skilled in the art. For example, solutions of the monomers may be exposed to the high intensity radiation emitted by radioactive isotopes or high voltage accelerators.

The invention will be further illustrated by the following specific examples.

*Example I*

A solution of 13.2 gm. (0.12 mole) of dimethallyl (2,5-dimethyl hexadiene-1,5) and 11.8 gm. (0.12 mole) of maleic anhydride in 25 gm. of dioxane was irradiated for 24 hours at room temperature in a 250,000 R./hr. cobalt 60 source—total dosage $6 \times 10^6$ R. A white insoluble polymer settled from the solution and was separated by filtration. After drying it weighed 18.4 gm. and did not melt below 290° C. The filtrate from this solid yielded no solid residue after evaporation. Thus, the 18.4 gm. of polymer is comprised of 11.8 gm. maleic anhydride and 6.6 gm. dimethallyl or almost exactly 1 mole dimethallyl and 2 moles of maleic anhydride. The calculated and found analyses for a cross-linked polymer of this composition are compared below:

|  | Calculated | Found |
|---|---|---|
| Percent C | 62.7 | 59.98 |
| Percent H | 5.9 | 7.10 |
| Percent O | 31.4 | 32.66 |
|  | 100.0 | 99.74 |

This solid was refluxed with potassium hydroxide in order to hydrolyze the anhydride portion of the molecule and form the potassium salt. 2.7 gm. was refluxed for 5 hours with 20 gm. KOH in 50 cc. water, 50 cc. ethanol, and 25 cc. isopropanol. The solid was then recovered, washed with hot methanol and dried to yield 4.3 gm. product. A sulfated ash determination on the product was 52.1%, equivalent to 23.4% K in the solid (calculated for the K salt of a completely hydrolyzed polymer of the above composition=31.7% K). The lower value actually found merely emphasizes the insoluble nature of the polymer whereby the central portions of the powder particles were not exposed to the hydrolyzing medium. The potassium salt is an effective ion-exchange resin. When 2 gm. of this salt was stirred for 2 hours with 100 cc. of hard water (236 p.p.m. Ca as the chloride) at room temperature and then filtered the calcium content in the water was reduced to less than 2 p.p.m.

*Example II*

14.4 gm. (0.057 mole) octadecene, 5.6 gm. (0.057 mole) maleic anhydride were dissolved in 30 gm. dioxane and 15 cc. benzene and irradiated in a cobalt 60 source at room temperature and 250,000 R./hr. for 24 hours (total dosage 6,000,000 R.). After this treatment the solvents were evaporated on a steam bath under vacuum and the residue was washed thoroughly with methanol. The methanol washings were discarded and the residue solidified to a waxy, water white solid weighing 16.3 gm. Theory for a 3/2 octadecene/maleic anhydride product is 18.6 gm. yield. The analyses calculated for this 3/2 molar ratio of octadecene/maleic anhydride are compared in the following table to the values found by analysis.

|  | Calculated | Found |
|---|---|---|
|  |  | *Mean* |
| Percent C | 78.0 | 77.69, 76.80 = 77.25 |
| Percent H | 11.9 | 12.66, 12.32 = 12.49 |
| Percent O | 10.1 | 9.06, 11.48 = 10.27 |
|  | 100.0 | 100.01 |

This product, while having only limited oil solubility as such, can be readily hydrolyzed and esterified to make it sufficiently soluble for use in lubricating oils. Alternately, the product can be hydrolyzed and neutralized to give a salt useful as a soil conditioner.

The nature of the present invention having been thus fully set forth and specific examples of the same given, what is claimed as new and useful and desired to be secured by Letters Patent is:

1. A copolymerization method which comprises exposing a mixture of dimethallyl and maleic anhydride in a 1 to 1 mole ratio in a dioxane solvent to a total dosage of about $6 \times 10^6$ roentgens of gamma radiation and separating an insoluble copolymer of dimethallyl and maleic anhydride.

2. A copolymerization process which comprises exposing a mixture of maleic anhydride and a non-conjugated diolefin in a mole ratio in the range of 1/1 to 5/1 at a temperature in the range of 0° to 300° F. to high energy ionizing radiation having an intensity in the range of about 100,000 to 5,000,000 R./hr. for a period of time in the range of about 0.5 to 24 hours.

3. A copolymerization process which comprises exposing a mixture of maleic anhydride and 2,5-dimethyl hexadiene-1,5 in a mole ratio in the range of 1/1 to 5/1 at a temperature in the range of 60° to 80° F. to gamma radiation of intensity in the range of about 100,000 to 5,000,000 R./hr. for a period of time in the range of about 0.5 to 24 hours.

4. An insoluble copolymer prepared by exposing a mixture of maleic anhydride and a non-conjugated diolefin in a mole ratio in the range of 1/1 to 5/1 at a temperature in the range of 0° to 300° F. to high energy ionizing radiation having an intensity in the range of about 100,000 to 5,000,000 R./hr. for a period of time in the range of about 0.5 to 24 hours.

5. A copolymerization process which comprises exposing a mixture of maleic anhydride and an olefinic material selected from the group consisting of a non-conjugated diolefin and a mixture of a non-conjugated diolefin and a mono-olefin at a temperature in the range of 0° to 300° to high energy ionizing radiation having an intensity in the range of about 100,000 to 5,000,000 R./hr. for a period of time in the range of about 0.5 to 24 hours, the mole ratio of said maleic anhydride to said olefinic material being in the range of 1/5 to 5/1.

6. The method of claim 5 wherein maleic anhydride is copolymerized with a mixture of said diolefin and said mono-olefin and the ratio of said non-conjugated diolefin to mono-olefin is between 5/95 and 95/5.

References Cited in the file of this patent

UNITED STATES PATENTS

| 2,297,351 | Gerhart | Sept. 29, 1942 |

FOREIGN PATENTS

| 1,079,401 | France | May 19, 1954 |
| 966,760 | France | Mar. 15, 1950 |
| 511,718 | Belgium | Nov. 28, 1952 |

OTHER REFERENCES

Proc. Royal Soc. of London, November-December 1952, vol. 215, pp. 206–207.

Arnold: Journal of American Chemical Society, vol. 61 (June 1939), pp. 1405–06.